US008724904B2

(12) United States Patent
Fujiki et al.

(10) Patent No.: US 8,724,904 B2
(45) Date of Patent: May 13, 2014

(54) ANOMALY DETECTION IN IMAGES AND VIDEOS

(75) Inventors: Yuichi Fujiki, Houston, TX (US);
Norman Haas, Mount Kisco, NY (US);
Ying Li, Mohegan Lake, CT (US);
Charles A. Otto, Lansing, MI (US);
Balamanohar Paluri, Atlanta, GA (US);
Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/280,896

(22) Filed: Oct. 25, 2011

(65) Prior Publication Data
US 2013/0101221 A1    Apr. 25, 2013

(51) Int. Cl.
*G06K 9/46*    (2006.01)

(52) U.S. Cl.
USPC ............................ 382/195; 382/225; 382/104

(58) Field of Classification Search
USPC .......................................... 382/195, 225, 104
See application file for complete search history.

(56) References Cited

U.S. PATENT DOCUMENTS

| | | | | |
|---|---|---|---|---|
| 4,737,847 | A * | 4/1988 | Araki et al. .................... | 348/161 |
| 4,794,647 | A | 12/1988 | Forgues et al. ................ | 382/147 |
| 6,028,948 | A | 2/2000 | Kil et al. ........................ | 382/108 |
| 6,038,335 | A | 3/2000 | Yokoyama et al. ............ | 382/141 |
| 6,356,299 | B1 * | 3/2002 | Trosino et al. ................. | 348/128 |
| 2002/0057428 | A1 * | 5/2002 | Nakayama et al. ......... | 356/239.2 |
| 2004/0122569 | A1 * | 6/2004 | Bidaud ........................... | 701/19 |
| 2005/0234879 | A1 * | 10/2005 | Zeng et al. ..................... | 707/3 |
| 2006/0017911 | A1 * | 1/2006 | Villar et al. .................... | 356/4.01 |
| 2006/0098843 | A1 * | 5/2006 | Chew ............................. | 382/103 |
| 2007/0217670 | A1 * | 9/2007 | Bar-Am ......................... | 382/141 |

(Continued)

FOREIGN PATENT DOCUMENTS

| | | | | |
|---|---|---|---|---|
| EP | 953491 | A1 | 11/1999 | ............... B61K 9/08 |
| JP | 2004132881 | A | 4/2004 | ............. G01N 21/88 |
| JP | 2006176071 | A | 7/2006 | ............... B61K 9/08 |

OTHER PUBLICATIONS

Huang, J.Z.; Ng, M.K.; Hongqiang Rong; Zichen Li, "Automated variable weighting in k-means type clustering," Pattern Analysis and Machine Intelligence, IEEE Transactions on , vol. 27, No. 5, pp. 657,668, May 2005.*

(Continued)

*Primary Examiner* — Stephen R Koziol
*Assistant Examiner* — Shaghayegh Azima
(74) *Attorney, Agent, or Firm* — Ido Tuchman; Anne V. Dougherty

(57) ABSTRACT

A system, method, and computer program product for detecting anomalies in an image. In an example embodiment the method includes partitioning each image of a set of images into a plurality of image local units. The method further includes clustering all local units in the image set into clusters, and consequently assigning a class label to each local unit based on the clustering results. The local units with identical class labels having at least one substantially related image feature. Further, the method includes assigning a weight to each of the local units based on a variation of the class labels across all images in a set of images. The method further includes performing a clustering over all images in the set by using a distance metric that takes the learned weight of each local unit into account, then determining the images that belong to minorities of the clusters as anomalies.

11 Claims, 14 Drawing Sheets

(56) References Cited

U.S. PATENT DOCUMENTS

| | | |
|---|---|---|
| 2008/0101678 A1 | 5/2008 | Suliga et al. |
| 2008/0195369 A1* | 8/2008 | Duyanovich et al. ........... 703/22 |
| 2009/0022391 A1 | 1/2009 | Huotilainen |
| 2009/0161967 A1 | 6/2009 | Ii et al. |
| 2010/0150426 A1* | 6/2010 | Onishi et al. .................. 382/144 |
| 2010/0223276 A1* | 9/2010 | Al-Shameri et al. .......... 707/769 |
| 2010/0260396 A1 | 10/2010 | Brandt et al. |
| 2010/0283842 A1 | 11/2010 | Guissin et al. ................. 348/68 |
| 2011/0043536 A1 | 2/2011 | Cobb et al. .................... 345/629 |
| 2011/0064273 A1 | 3/2011 | Zarembski et al. ........... 382/104 |
| 2011/0069876 A1* | 3/2011 | Kanda .......................... 382/134 |
| 2011/0182495 A1* | 7/2011 | Sun et al. ..................... 382/141 |
| 2012/0121139 A1* | 5/2012 | Kojima et al. ................ 382/112 |
| 2012/0263342 A1* | 10/2012 | Haas et al. .................... 382/100 |
| 2012/0294511 A1* | 11/2012 | Datta et al. .................... 382/155 |
| 2012/0311933 A1* | 12/2012 | Reinhard et al. ................. 49/25 |

OTHER PUBLICATIONS

International Search Report and Written Opinion, PCT Application No. PCT/US2012/059158, p. 1-9 (Dec. 11, 2012).

Maneesha Singh et al, "Autonomous rail track inspection using vision based system", CIHSPS 2006—IEEE International Conference on Computational Intelligence for Homeland Security and Personal Safety, p. 56-59, 2006.

* cited by examiner

ANOMALY DETECTION IN IMAGES AND VIDEOS

BACKGROUND

The present invention is directed to the field of computer systems, and more specifically to a method and system of anomaly detection in images and videos.

Anomaly detection is defined as the problem of finding abnormal patterns in the given data. An abnormal pattern is anything that does not conform to normal. It has been introduced and researched upon by various researches in the past few decades. It has been studied by the statistical community for a century. It is very subjective by nature. An anomaly in one case can be completely normal in another case. So, domain knowledge is very important to develop a robust solution for detecting anomalies. The problem is prevalent in various fields such as, surveillance, network security, fraud detection, speech recognition, medical imaging etc and has wide applications.

Most algorithms try to model normal patterns and determine the deviation of the new patterns to the models and use this to classify anomalies. Existing methods vary from full supervision to no supervision. The amount of supervision ranges a lot from Rule-based methods, compared to unsupervised methods that directly learn normal activity patterns.

SUMMARY

An example embodiment of the present invention is a system for detecting anomalies in images. The system includes a processor and a memory coupled to the processor. The memory includes computer readable program code embodied on it which is configured to partition each image of a set of images into a plurality of local units. The computer readable program code is further configured to cluster all local units in the image set into clusters, and assign class labels to the local units. The local units with identical class labels have at least one substantially related image feature. Furthermore, the computer readable program code is configured to assign a weight to each of the local units based on the variation of the class labels across images in the set of images. The computer readable program code is further configured to perform a clustering over all images in the set by using a distance metric that takes the assigned weight of each local unit into account, then determine the images that belong to minorities of the clusters as anomalies.

Another embodiment of the invention is a method for detecting anomalies in an image. The method includes partitioning each image of a set of images into a plurality of image local units. The method further includes clustering all local units in the image set into clusters. The method further includes assigning class labels to the local units based on a clustering result from clustering the local units. The local units with identical class labels have at least one substantially related image feature. An assigning operation assigns a weight to each of the local units based on a variation of the class labels across all images in the set of images. The new image is then categorized as anomalous based on the weight assigned to the local units.

A further embodiment of the invention is a computer program product for detecting anomalies in an image. The computer program product includes a computer readable storage medium having computer readable program code embodied on it. The computer readable program code is configured to localize a tie plate region in an image in a set of tie plate images. The computer readable program code is also configured to divide the tie plate region into a set of local units. Additionally, the computer readable program code is further configured to extract features from each local unit in the set of local units. The computer readable program code is further configured to perform a clustering over all local units. The computer readable program code is moreover configured to assign a class label to each local unit indicating a semantic content of the local unit, then determine the weight of each local unit across all images in the set of images. The computer readable program code is further configured to categorizing the tie plate image as anomalous based on the weight assigned to the local units.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 7 shows three tie-plates with cells colored based on the cluster they were assigned to.

FIG. 10 shows anomalies detected using an example embodiment of the present invention.

FIG. 12 shows the anomalies found by doing weighted clustering of Gabor features instead of labels for the agglomerative clustering step in an example embodiment of the present invention.

FIG. 13 shows the anomalies found using a default distance metric instead of a weighted distance metric.

FIG. 14 shows the anomalies found using K-Means on the Gabor features of each tie-plate without dividing into grids or using weighted distance metric.

DETAILED DESCRIPTION

Figure 1:
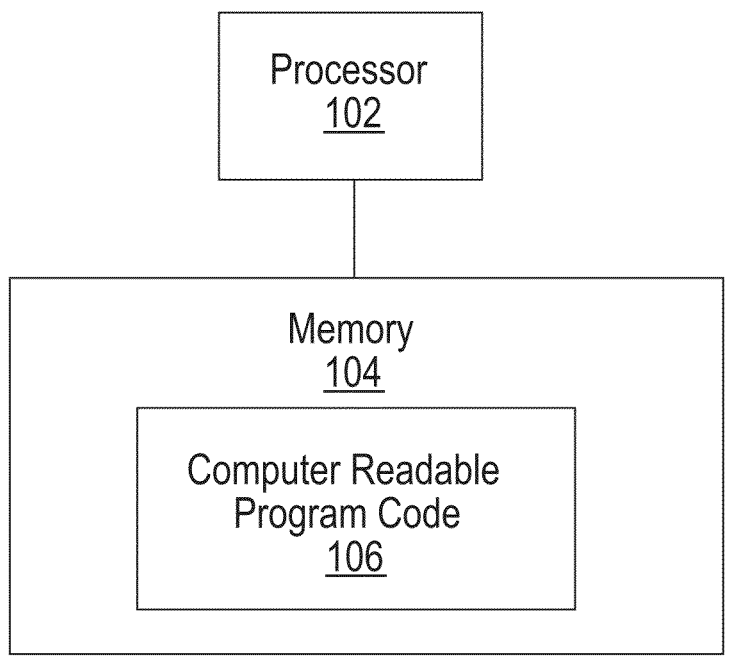
FIG. 1 illustrates an example system for detecting anomalies in an image.

This disclosure gives a description of the problem of anomaly detection. One embodiment is specifically adapted for rail data and details the experiments carried out towards solving the problem. The data may be captured by a camera mounted on a vehicle that moves on railway tracks. The video data can mainly consist of track, ballasts (gravel), and fasteners such as tie-plates, spikes, etc. An objective of this embodiment is to learn the pattern of the data over time and detect aberrant patterns as and when they appear. A potential assumption made by the system is the frequency of occurrence of normal patterns is high compared to abnormal patterns. A typical example is to learn the frequently occurring spike pattern and whenever a different spike pattern is observed the system/user is notified about the finding. A man in the loop can then verify the abnormality and either concur with the system or give a negative feedback which the system has to incorporate to classify new anomalies. For example, if the dominant spike pattern in the data is "spike present in the right slot" and the less occurring pattern is "spike in the left slot" and "no spike," the goal is to detect the dominant pattern and raise flags for rest of the cases.

A spiking pattern refers to the way that spike(s) are fastened to each tie plate. Generally speaking, for different classes of rail tracks and different curvatures that each track has, the spiking patterns are different. As a rule of thumb, the higher the track class, the stricter the spiking patterns. Nevertheless, for the same track, a change of spiking pattern (especially a change from a spiking pattern of higher standard to a spiking pattern of lower standard), is usually the signal that something has been wrong (e.g. spikes have been missing). Human attention may be needed in this case to see if certain maintenance should be carried out. Missing spikes could be the root cause for derailment.

Embodiments of the present invention propose ideas to improve the detection performance of anomalies in video and images by incorporating a weighting mechanism into some popular clustering approaches, as well as by performing some semantic label-based clustering.

Specifically, given the test data (an image or a video frame), a local unit can be defined, which could be either a local spatial unit or a temporal unit, or both. A global clustering can be performed to learn a semantic label for each unit, where such label reflects the semantics of each unit, to some extent. Next, a weight for each unit can be determined by observing the change of its semantic labels within a temporal window. As a result, a larger weight will be given to a unit that likely contains anomalous patterns, while a smaller weight will be given to a unit that most likely contains normal behavior. The learned weights can then be incorporated into the distance metric which is used by some hierarchical clustering process to group all images or video frames into either normal or anomalous class.

The present invention is described with reference to embodiments of the invention. Throughout the description of the invention reference is made to FIGS. 1-15. It is noted that the configurations and ordering shown is just one example of various arrangements of the present invention and should not be interpreted as limiting the invention to any particular configuration.

FIG. 1 illustrates an example system for detecting anomalies in an image. The system 100 may include a processor 102. A memory 104 may be coupled to the processor 102.

The memory 104 may have computer readable program code 106 embodied on it. The computer readable program code 106 may be configured to perform various tasks for the system 100. One such task may include partitioning each image of a set of historical images into a plurality of image local units. The computer readable program code 106 may also be configured to cluster all local units into clusters. The computer readable program code 106 may further be configured to assign a class label to each local unit based on the clustering result, the local units with identical class labels having at least one substantially related image feature. The computer readable program code 106 may also be configured to assign a weight to each of the local units based on a variation of the class labels across all images in a set of images.

Figure 2A:
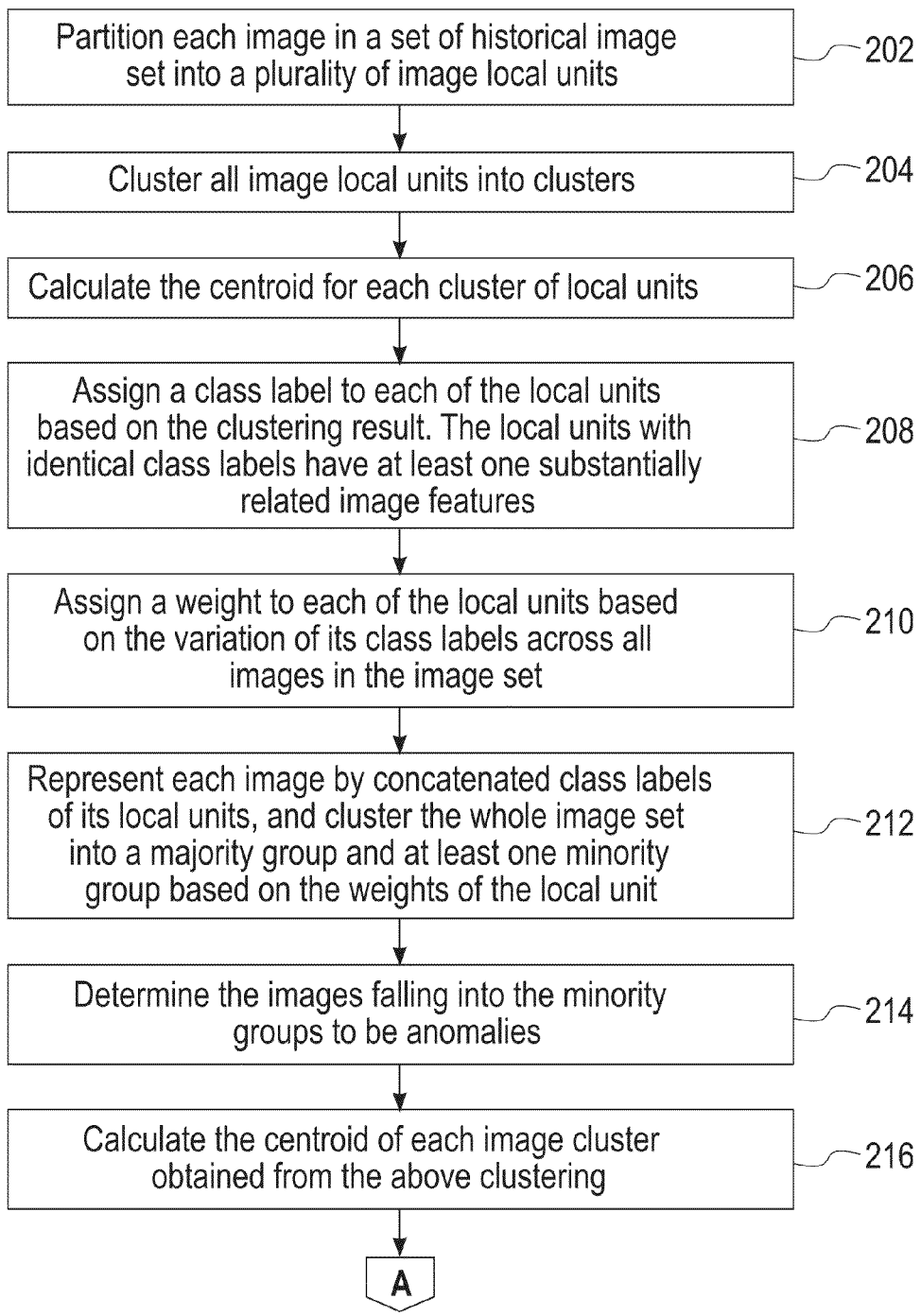
FIGS. 2A and 2B is a flowchart illustrating an example method for detecting anomalies in an image, as contemplated by the present invention.
Figure 2B:
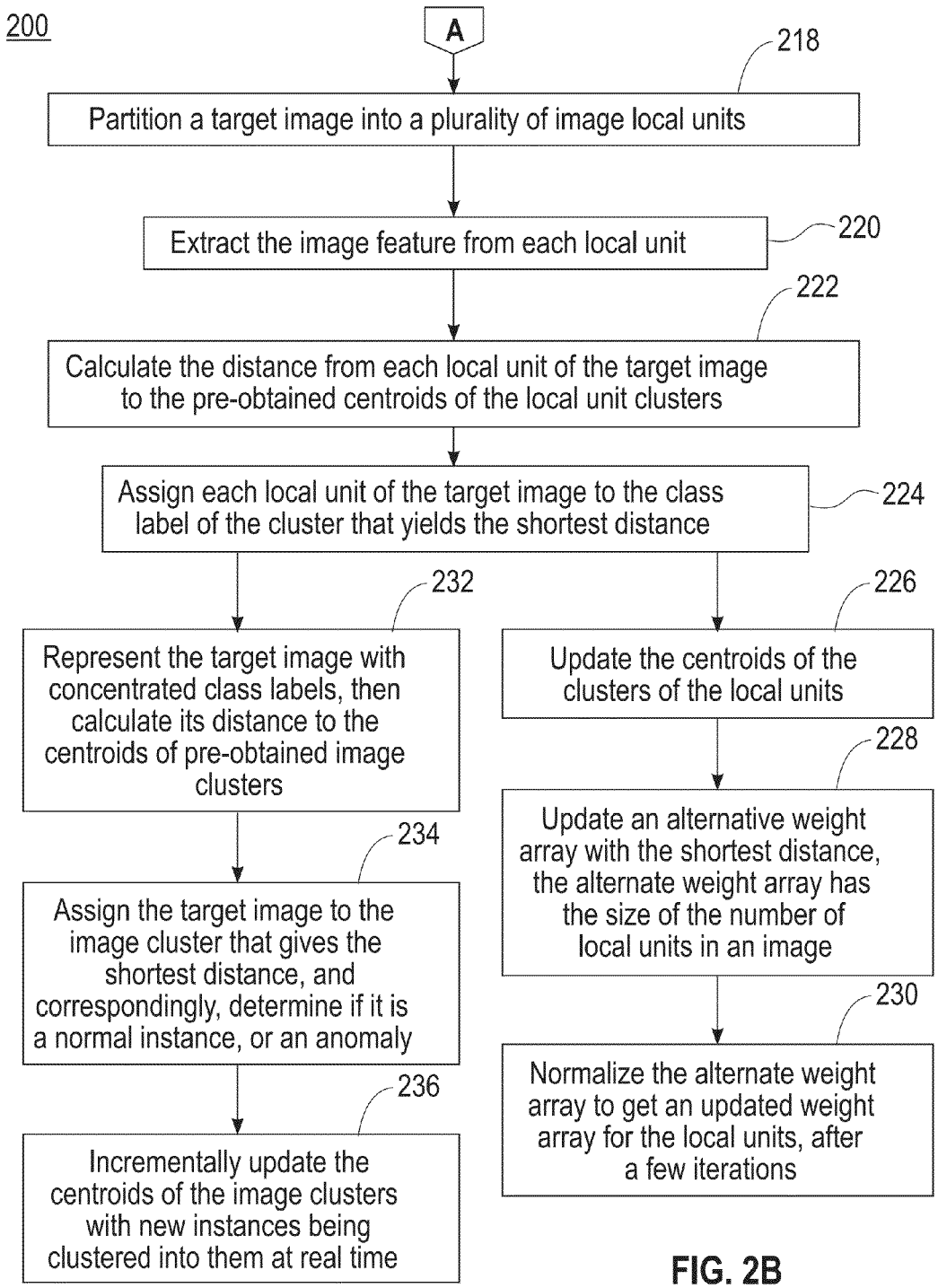

FIGS. 2A and 2B is a flowchart illustrating an example method for detecting anomalies in an image, as contemplated by the present invention.

An embodiment of the method 200 for detecting anomalies in an image may include both offline and online operations. During offline mode, all images in a set of historical images will be clustered into either normal or anomalous class.

As shown in FIGS. 2A and 2B, at partitioning operation 202, each image in the image set will be first partitioned into a plurality of image local units. Then, all image local units are clustered into clusters at clustering operation 204. At calculating operation 206, the centroid of each cluster is calculated subsequently, which later on could be used in the online operation. Next, at assigning operation 208, each local unit is assigned a class label based on the clustering result. The local units with identical class labels have at least one substantially related image features.

Next, at assigning operation 210, each local unit is assigned a weight based on the variation of its class labels across all images in the image set. Next, at representing operation 212, each image is represented by concatenated class labels of its local units, and a global clustering is performed to cluster all images in the image set into a majority group and at least one minority group, based on the weights of the local units.

Next, at determining operation 214, the images falling into the minority group are determined to be anomalies. Finally, at calculating operation 216, the centroid of each image cluster obtained from the above clustering is calculated.

During the online mode, a new instance, or, a target image will be classified into either a normal instance or an anomaly. Specifically, at partitioning operation 218, the target image is first partitioned into a plurality of image local units. Then, at extracting operation 220, image features are extracted from each local unit. Next, at calculating operation 222, the distances from each local unit of the target image to the centroids of clusters of local units, which is obtained from the offline operation at calculating operation 206, are calculated.

Next, at assigning operation 224, each local unit of the target image is assigned to the class label of the cluster that yields the shortest distance. Next, at updating operation 226, the centroids of those local unit clusters are updated with the inclusion of this target image. Next, on one hand, an alternate weight array will be updated at updating operation 228 with the shortest distance, where the alternate weight array has the size of the number of local units in an image. After a few iterations (i.e. after classifying a few new instances), the alternate weight array can be normalized at normalizing operation 230 to get an updated weight array for the local units, based on the original weight array. This updated weight array will be used in subsequent online operation.

On the other hand, at representing operation 232, the target image is represented with concatenated class labels, then its distance to the centroids of image clusters is calculated. The centroids of image clusters are obtained from the offline operations at calculating operation 216. Next, at assigning operation 234, the target image is assigned to the image cluster that gives the shortest distance, and correspondingly, determine if it is a normal instance, or an anomaly. Finally, at updating operation 236, the centroids of the image clusters are incrementally updated as there are new instances being clustered into them.

Figure 3:
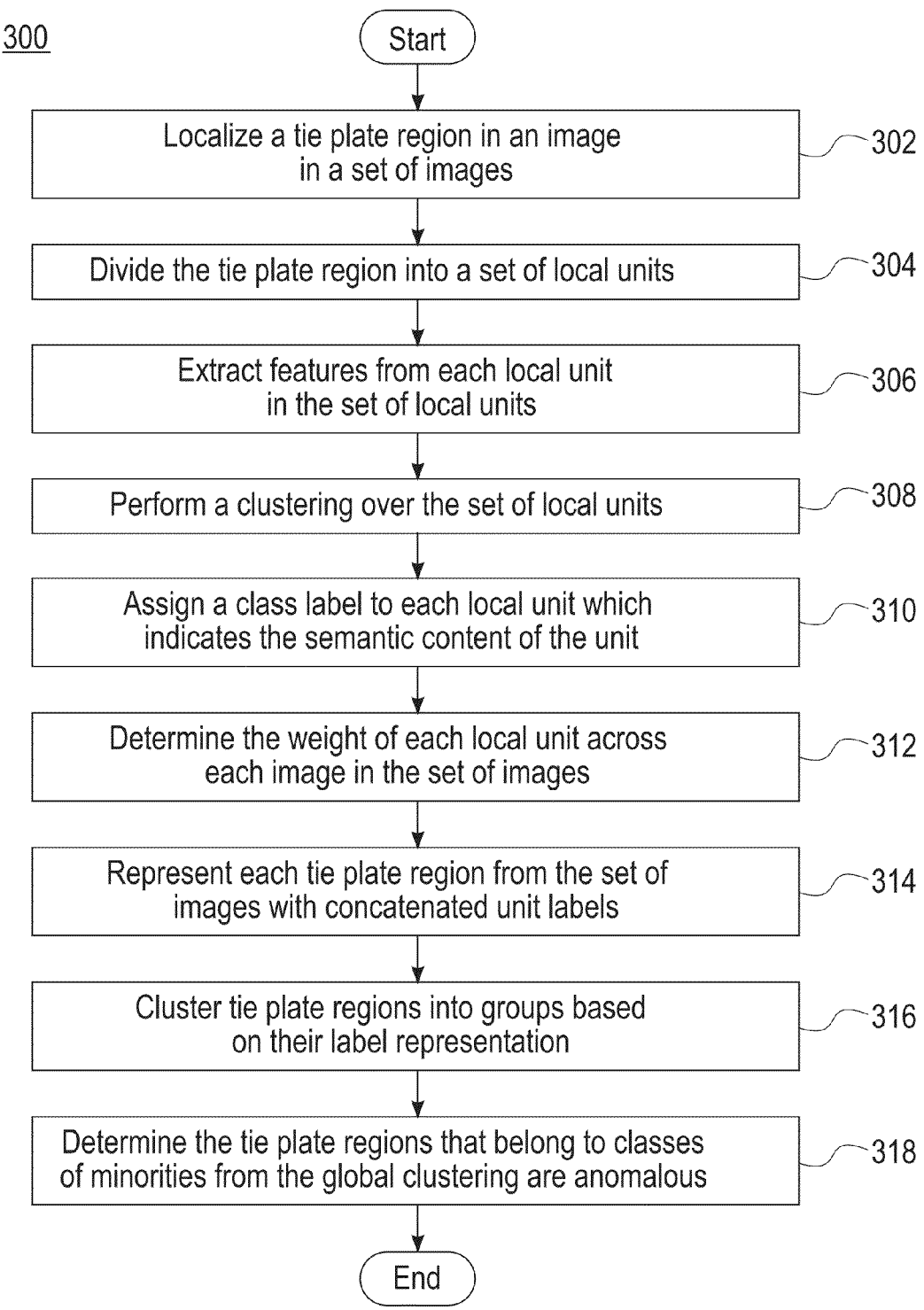
FIG. 3 is a flowchart illustrating an example method for detecting anomalies in an image, as contemplated by the present invention.

FIG. 3 is a flowchart illustrating an example method for detecting anomalies in an image, as contemplated by the present invention.

An embodiment of the method for detecting anomalies in an image 300 may include localizing, at block 302, a tie plate region in an image in a set of images. This region can be fed into the rest of the anomaly detection mechanism. The method 300 can continue by dividing the tie plate region into a set of local units, at block 304. In an embodiment of the present invention the tie plate region is spatially partitioned into M*N grids. One example embodiment includes a 10*6 grid structure. The method 300 may continue, at block 306, by extracting features from each local unit in the set of local units. In different embodiments of the invention various features could be applied such as Gabor, edge magnitude, and edge direction.

The method 300 may also include performing a clustering over the set of local units, at block 308. In an embodiment of the invention any clustering approach can be used. In a specific embodiment, K-Means clustering is used, where k is set to 3.

In a further embodiment of the invention, the method 300 would include assigning a class label to each local unit which indicates the semantic content of the unit, at block 310. For example, the majority of units that contain rail material would be assigned to one class while units that contain ballast, split, spike slot, and some tie-plate are assigned to another class.

The method 300 can also include determining, at block 312, the weight of each local unit across each image in the set of images. In a particular embodiment, when there is a lot of variations of the labels the content of that unit may be assumed to have changed much along time, which can indicate that this unit contains anomalous content. In some embodiments of the invention larger weights are assigned to units that present larger variations while smaller weights are assigned to units whose labels do not change much. This may stress the importance of units which likely contain anomalous content.

At block 314, the method 300 can continue by representing each tie plate region from the set of images with concatenated unit labels. Representing the tie plate region with concatenated labels, instead of concatenated feature vectors, makes the system more robust to small content variations in each unit.

Method 300 may continue by clustering the tie plate regions into different groups based on their label representation, at block 316. The weights of local units that are derived earlier will be incorporated into the distance metrics for the clustering. This may be accomplished by applying a distance-based global clustering over the tie plate regions in the image set. In an example embodiment, agglomerative clustering is used, as it may be easier to specify a stopping criterion and applying the weighted distance metric using this method.

At block 318, method 300 may include determining the tie plate regions that belong to classes of minorities from the global clustering are anomalous. In an example embodiment after a global clustering a single majority class emerges and the rest are minority classes that are deemed to be anomalies.

Anomaly detection can be posed as either of the following three problems:

supervised—All normal and abnormal patterns are labeled and a model is learned. This model is used to classify a new instance.

semi-supervised—All normal patterns are labeled and a model is learned. Any new instance that is not classified as normal using this model is classified as abnormal.

unsupervised—The system is only provided unlabeled data and it automatically learns what is normal versus what is abnormal. The fundamental assumption that systems usually make in this scenario is the frequency of normal patterns is higher than abnormal patterns. Without this assumption the problem may be intractable.

While supervised techniques may be preferred over unsupervised ones they are not scalable. Acquiring labeled data for all types of anomalies may not be feasible in a lot of scenarios. On the contrary unsupervised techniques depending on the method being used may make certain assumptions on the data. If these assumptions do not hold then the system may not be accurate. If one cannot enumerate the type of anomalies for an application then unsupervised techniques may be the best bet. Embodiments of the invention fall into this category as many assume there is no prior knowledge of all the anomalies that can occur in the railway data.

Embodiments of the invention detect anomalies in tie-plates. The input to the system can be examples of segmented tie-plates and the expected output can be a label for each tie-plate signifying whether it is normal/abnormal. The basic machinery used for detecting anomalies may be based on clustering. The variables in the experiments are explained below:

Feature Type: Gabor, edge direction, and edge magnitude are the features that may be experimented with. The segmented tie-plates can be of size 252×120 (width×height). Gabor features can be extracted for every 4×4 window for four different directions and two frequencies. So for each window in this example the Gabor feature descriptor is 8 dimensional. Edge magnitude and Edge direction can be extracted at each pixel so the dimensionality of edge features is same as the segmented tie-plate.

Figures 4, 5:
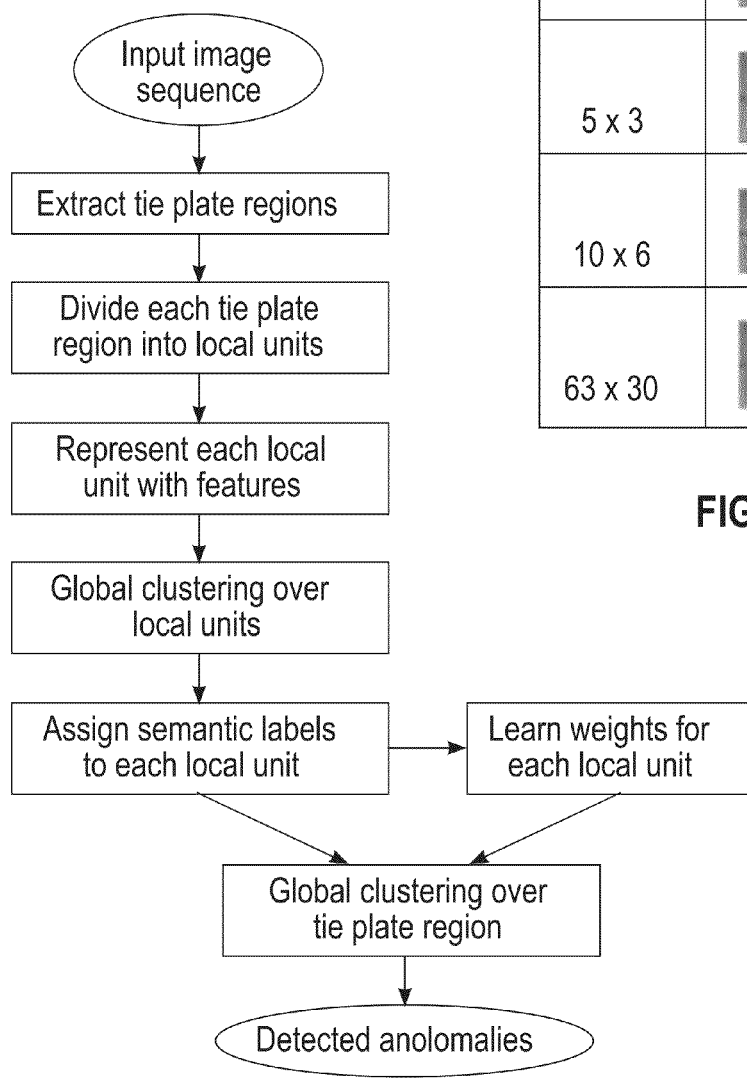
FIG. 4 is a table listing the experiments that were carried out for various grid sizes and a sample image of the grid.
FIG. 5 is a flowchart illustrating an example method for detecting anomalies in an image, as contemplated by the present invention.

Grid Size: Each tie-plate can be divided into M×N cells (or, local units) where M is the number of cells in a row and N is the number of cells in a column. Each grid is considered as a local unit in this case. FIG. 4 is a table listing the experiments that were carried out for various grid sizes and a sample image of the grid.

Features: The tie-plate can be segmented to cells and each cell can be represented by the following options:

Full: Each cell is represented by a concatenated feature vector containing the features of all the pixels belonging to the cell.

Mean: Each cell is represented by the mean of the feature vectors belonging to cell.

Label: This option is used when a clustering is performed first on the cells. The cluster label is then used to represent this cell instead of the actual feature vector.

Clustering Type:

Global: Clustering is performed for all the cells across tie-plates.

Local: Clustering is done separately for each cell across all images in an image set.

Clustering Methods:

K-Means

Spectral Clustering

Agglomerative Clustering

FIG. 5 is a flowchart illustrating an example method for detecting anomalies in an image, as contemplated by the present invention. Note that a local unit in this figure refers to an image cell as described above.

Since the number of clusters of the global clustering performed at Block 316 in FIG. 3 may not be pre-determined, spectral clustering and agglomerative clustering techniques may be used. Agglomerative clustering may have an advantage of giving a hierarchical tree output which can be cut at any level. So, anomalies can be rated and only the top X % can be displayed.

Distance Metric: While performing the clustering at Block 316 in FIG. 3, one can use a weighted distance metric that weights each cell separately or use a uniform distance metric. Weights may be determined on a uniform or on a weighted basis.

Gabor features may work better than edge features for finding anomalies. Dividing the tie-plate into small cells may help in finding micro anomalies. These anomalies include crooked tie-plates, extra spikes, debris on the tie-plate etc. These cells can be clustered using K-Means. Each cell may then get a label. These labels may mostly symbolize if the cell belongs to the track, join between the track and plate or debris. Each tie-plate may now be represented with the cell labels instead of Gabor features as this may be a more robust representation. Agglomerative clustering may be performed on these new features. Instead of using a default distance metric (Euclidean or Manhattan) a weighted distance metric may be used. Using a weighted distance metric may help in giving importance to the cells that had high probability of containing anomalies and carried more information. These weights can be determined by calculating the entropy of labels at each cell. The cluster containing maximum number of samples may be considered to belong to the normal instances and the rest are classified as anomalies. If the underlying distribution is multi-modal one can change the last step to threshold on the number of instances required in a cluster to classify it as normal. Finally, embodiments of the proposed method can be an Agglomerative clustering based anomaly detection that uses weighted distance metric. These weights may be updated online.

Figure 6:
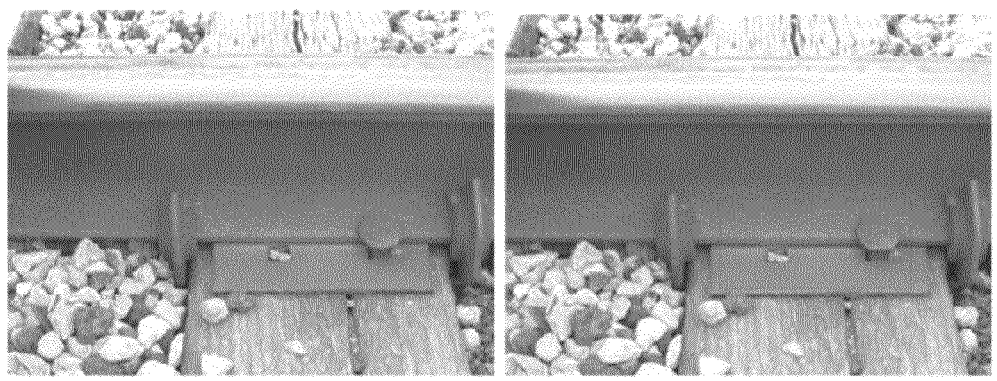
FIG. 6 is an example input image and segmented output using edge features as contemplated by the present invention.

Segmentation: Given the video data of the railway track, regions of interest can be first segmented. FIG. 6 is an example input image and segmented output using edge features as contemplated by the present invention. The segmentation algorithm may be completely independent of the anomaly detection pipeline as long as the segmented regions are of same size. Edge based methods can be used to segment out the tie-plates from the video.

Feature Extraction: This module may extract features from the segmented regions of interest. Gabor features of each tie-plate may be used as a representation for anomaly detection. For each 4×4 window of the tie-plate mean and standard deviation can be extracted for four orientation maps (0, 45, 90, and 135 degrees). So, each window would then be represented by an 8-dimensional feature vector.

Figure 7:
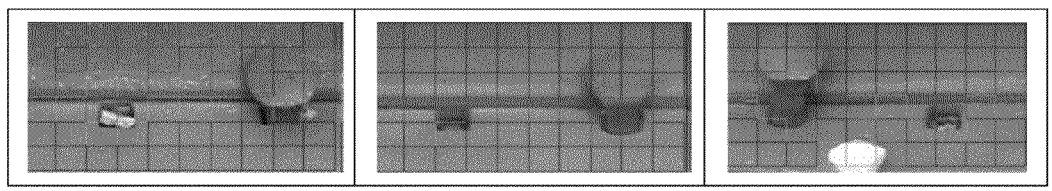

Clustering Grids: Each tie-plate can be divided into cells of fixed size, for example 60 cells (10×6). Each cell can be addressed as $C_{ij}^t$, where i ranges [1 ... Ny], j ranges [1 ... Nx] and t ranges [1 ... T], where Ny is the number of cells in a column, Nx is the number of cells in a row and T is the number of Tie-plates. Each cell can have a corresponding feature descriptor $F_{ij}^t$. All cells represented by features F, across all tie plate regions in the image set can then be clustered using K-Means algorithm. After this step each cell may get a label $L_{ij}^t$ which ranges between [1 ... K]. Here K indicates the number of clusters used by the K-Means algorithm. FIG. 7 shows three tie-plates with cells colored based on the clusters they were assigned to.

Figure 8:
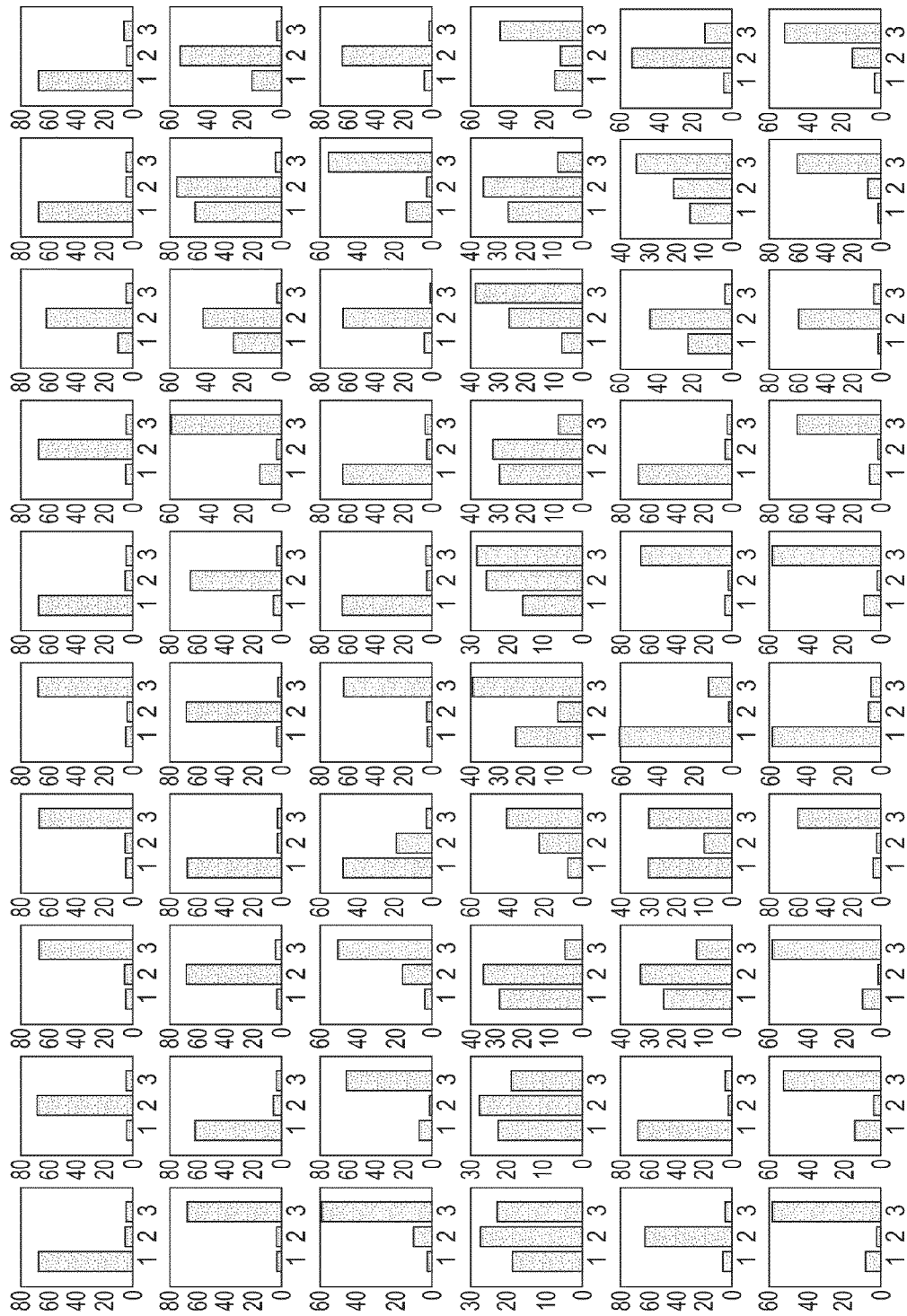
FIG. 8 displays a histogram of labels for each cell in an example embodiment of the invention.
Figure 9:
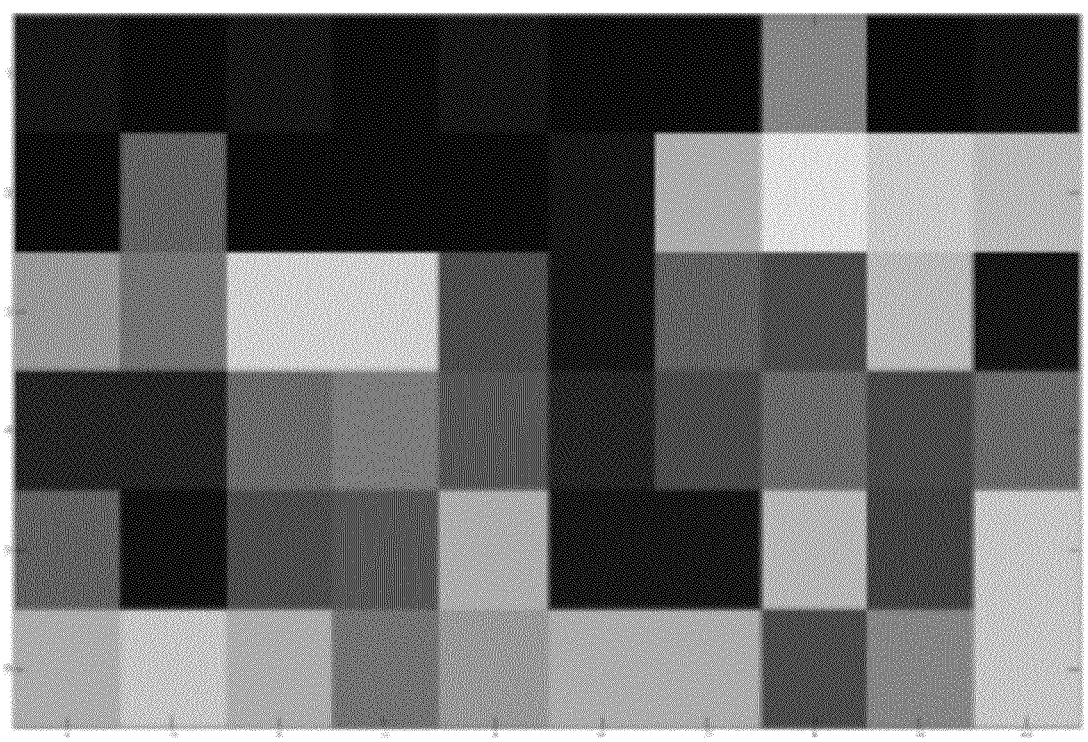
FIG. 9 displays the weights of all cells determined using entropy of the labels in an example embodiment of the invention.

Learning Weights: The distribution of labels for a particular cell across all tie-plates may give an idea of the variations that occur in that cell. FIG. 8 displays a histogram of labels for each cell in an example embodiment of the invention. Since entropy may give the measure of uncertainty associated with a random variable, so if we consider the label for each cell as the random variable, entropy may give the measure of uncertainty associated with each cell. If this uncertainty is low then it can mean the chance of an anomaly occurring in the cell is less as compared to a cell that has higher entropy. Hence, when computing distance between two-tie plates different weights can be used for each cell based on this entropy measure. In the figure one can see that the histograms for rows 4 and 5 indicate highest variation whereas the other histograms mostly have a single dominant bin. Entropy for each cell can be calculated using the equation $E(X) = -\Sigma p(x) \log(p(x))$. Normalized entropy can then be used as the weight for each cell when computing the distance between two tie plate regions. FIG. 9 displays the weight of each cell determined using entropy of the labels in an example embodiment of the invention, where darker color indicates higher value and lighter color indicates lower value. Apparently, row 4 carries higher weights and a few parts of row 5 also carry significant weights. As a matter of fact, these cells belong to the spots where spike is present or absent.

Weighted Distance Metric: For performing agglomerative clustering the default distance metric used may be Euclidean or Manhattan distance measure. The Euclidean distance between two feature vectors (F1 and F2) of two cells (C1 and C2) may be given by the equation $d(C_1, C_2) = \sqrt{\Sigma(F_1 - F_2)}$. The modified weighted distance metric may be given by equation $d(C_1, C_2) = \sqrt{\Sigma W * (F_1 - F_2)}$. In the modified weighted distance each feature may be weighted by the weight of its corresponding cell. This new distance metric magnifies the difference in cells that may have a greater potential of anomalies occurring and subdues the difference in rest of the cells.

Clustering Tie-Plates: Each tie-plate may be represented by concatenating the feature vectors of the cells. These feature vectors can be concatenated labels or concatenated Gabor features. Labels may give better results. The new distance metric may be used to cluster the tie-plates. Agglomerative clustering can be divided into three main steps. The first step can be to compute pairwise distance between the instances. The second step can be to combine the instances into clusters. Depending on the measure used to combine instances the results may vary. The shortest distance metric may be used, for example, two instances that are nearest to each other are combined into a cluster and the process is repeated iteratively. This can yield a hierarchical tree that can be stopped at any level. Based on the number of clusters provided by the user the clustering process may be cut stop. The cardinality of the cluster may be a good indicator if it is normal or abnormal. Any cluster with samples less than a predefined threshold can be considered as an anomalous cluster.

Experiments & Results: Upon experimentation we found Gabor features to be the most distinguishing features for finding anomalies. Each tie-plate was divided into 60 small cells (10×6). Each cell was represented by the concatenated Gabor features. These cells are clustered using K-Means. Upon experimentation K=3 gave the best results. Approximately 80% of the cells belonged to the metal from the railway track and are clustered into one major cluster. The two other clusters belong to the cells between the track and tie-plate and to the slot with no spikes and debris. Each cell is represented by the label. For each cell the entropy of the distribution of labels is used as the weight. Then agglomerative clustering is performed using a weighted distance metric as explained above. The clustering can be terminated either by selecting the number of clusters or the distance cutoff. For our experiments we used 15 clusters.

Figure 10:
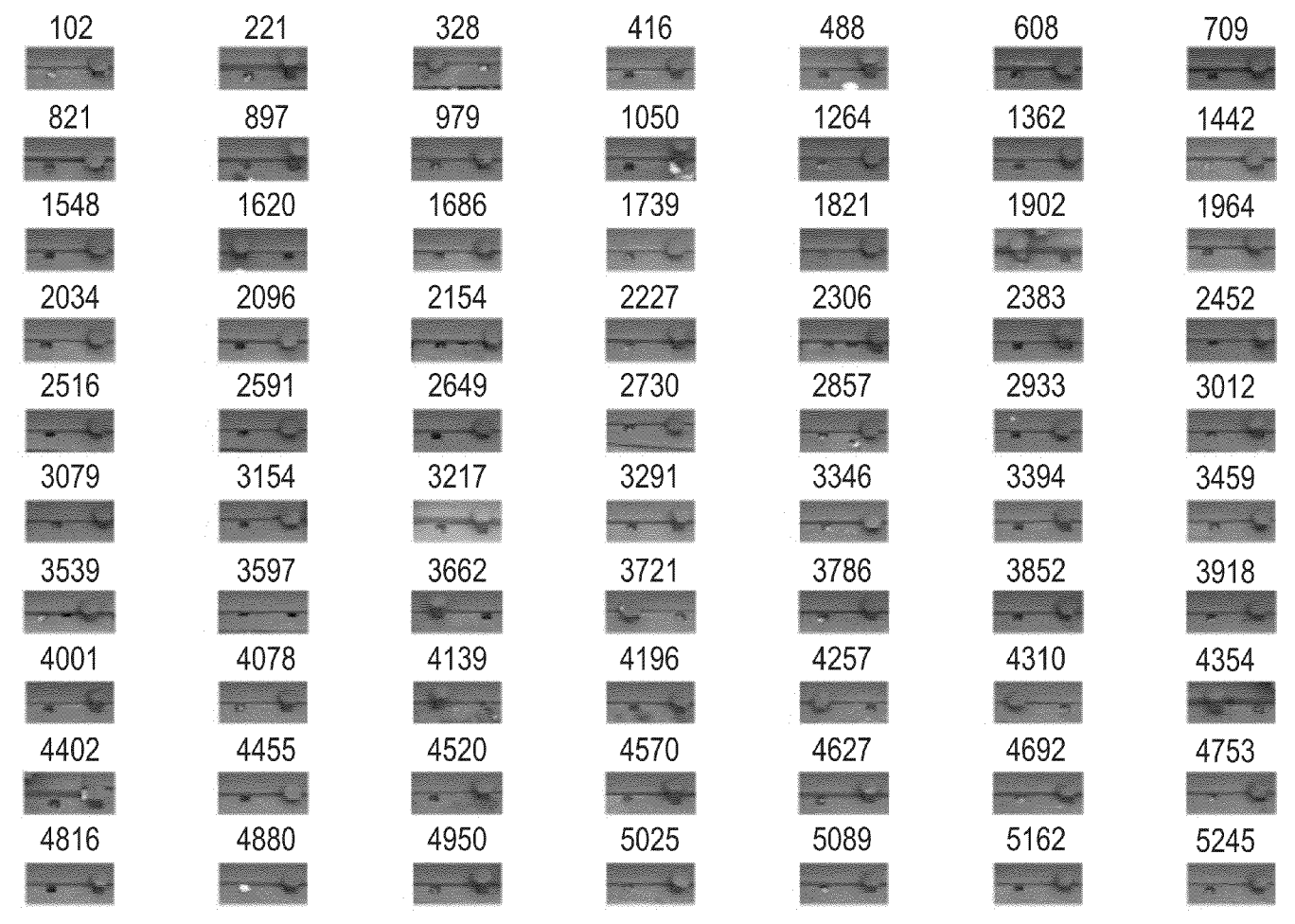

FIG. 10 shows anomalies detected using an example embodiment of the present invention. The anomalies have darker frame numbers where as the normal patterns have lighter frame numbers.

Figure 11:
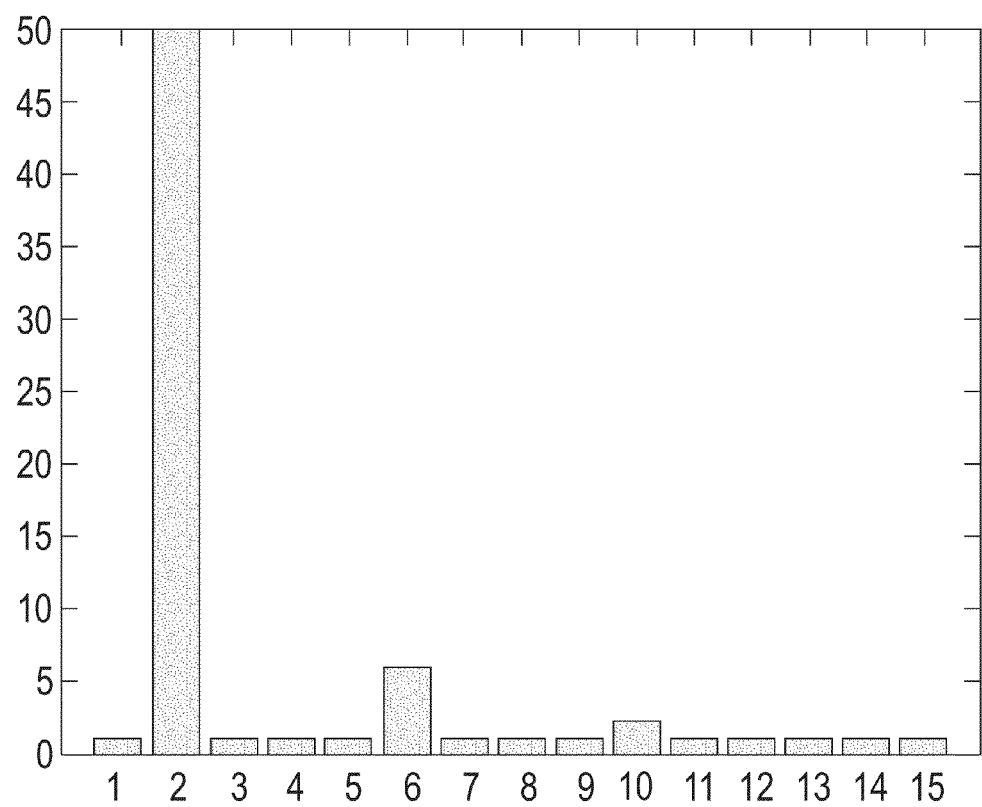
FIG. 11 is a histogram showing the distribution of the final 15 clusters in an example embodiment of the invention.

FIG. 11 is a histogram showing the distribution of the final 15 clusters in an example embodiment of the invention. There is a dominant cluster that belongs to the well-segmented tie-plates with spike in the right slot. The second largest cluster has six samples with most of them belonging to the tie-plates with spikes in the left slot. Rest of the clusters have one instance each and belong to various anomalies caused due to bad segmentation, additional spikes, bolts, corroded metal, ballasts on the tie-plate etc. Tie-plates 328 and 3597 are false negatives and 2649 and 3217 are false positives.

Figure 12:
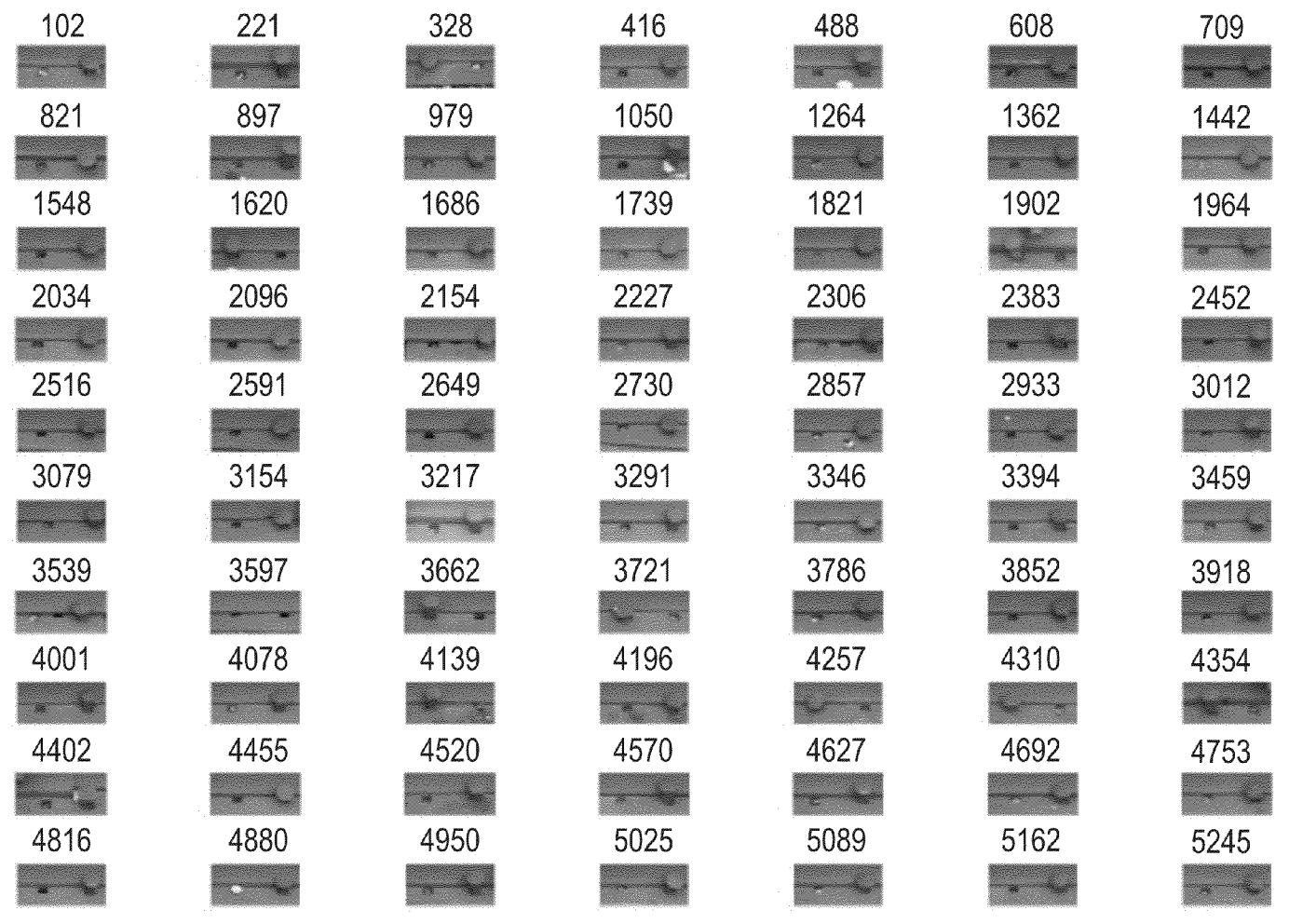

FIG. 12 shows the anomalies found by doing weighted clustering of Gabor features instead of labels for the agglomerative clustering step in an example embodiment of the present invention. Compared to the results shown in FIG. 10, there are slightly more false negatives and false positives in FIG. 12. This indicates that clustering based on labels is more robust to minor variations than based on features. But using features also seems logical and has achieved reasonable results.

Figure 13:
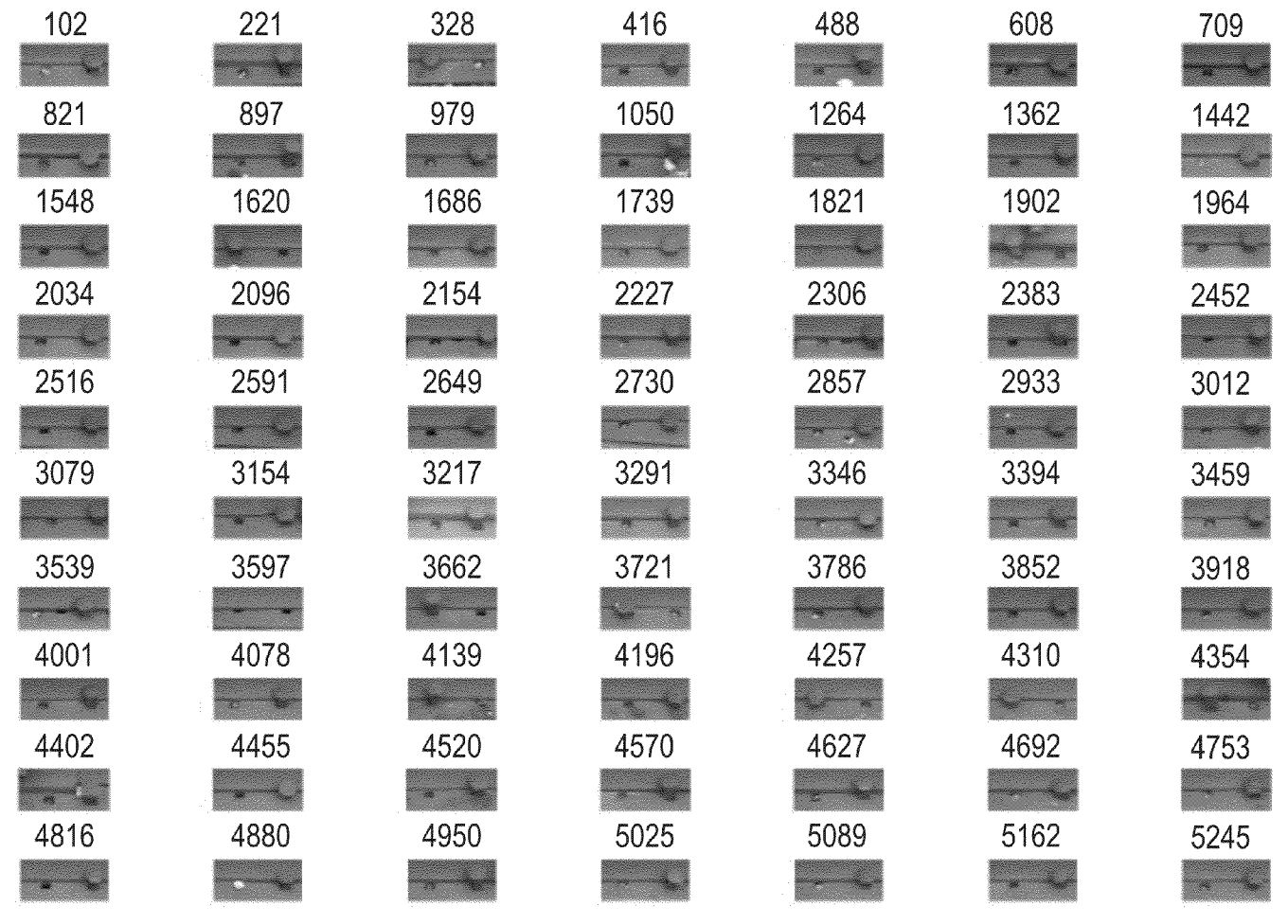

FIG. 13 shows the anomalies found using a default distance metric instead of a weighted distance metric during the agglomerative clustering. There are a considerable number of false positives and false negatives in this case as compared to the weighted method. This signifies the importance of using a weighted distance metric.

Figure 14:
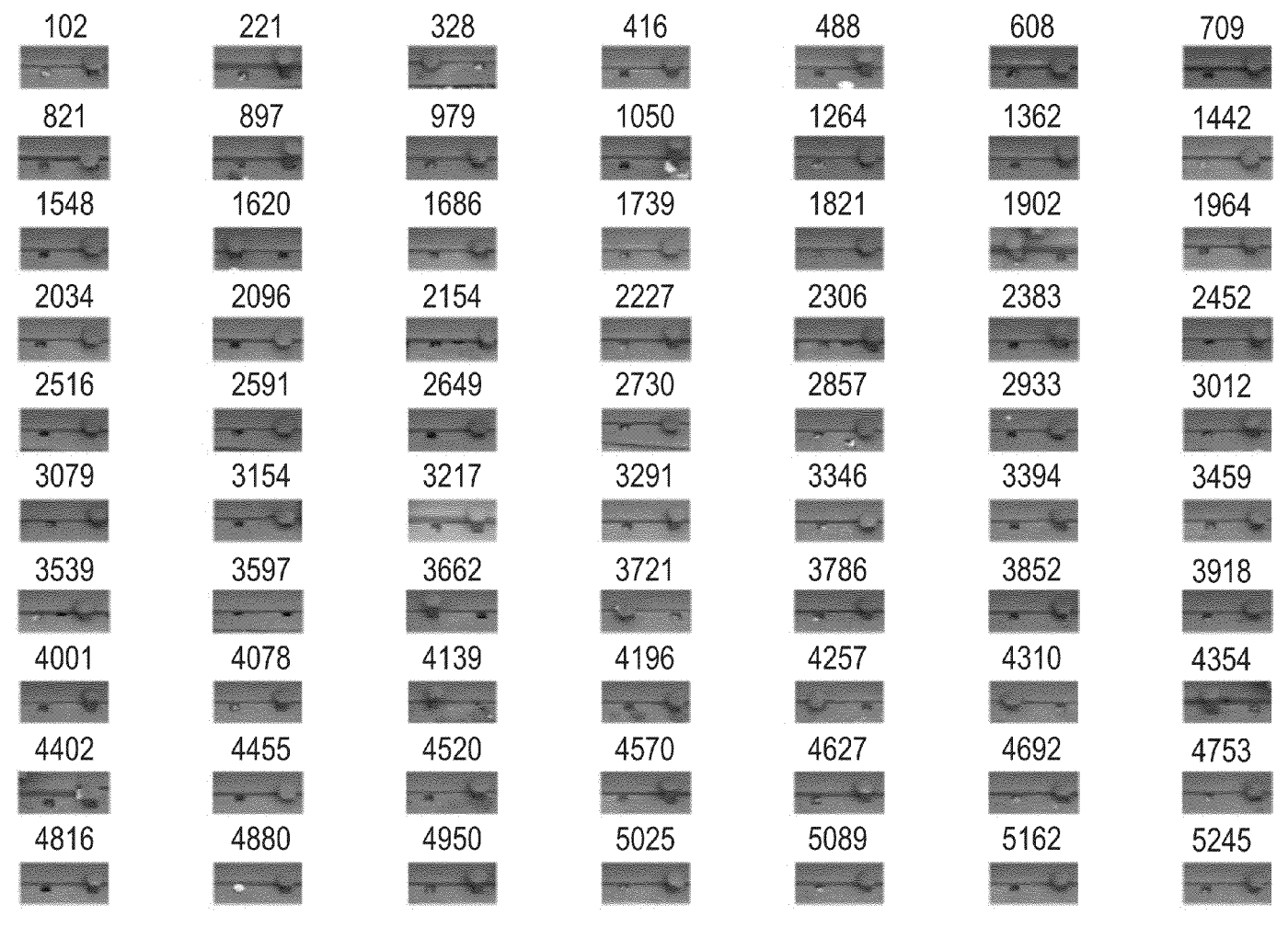
Figure 15:
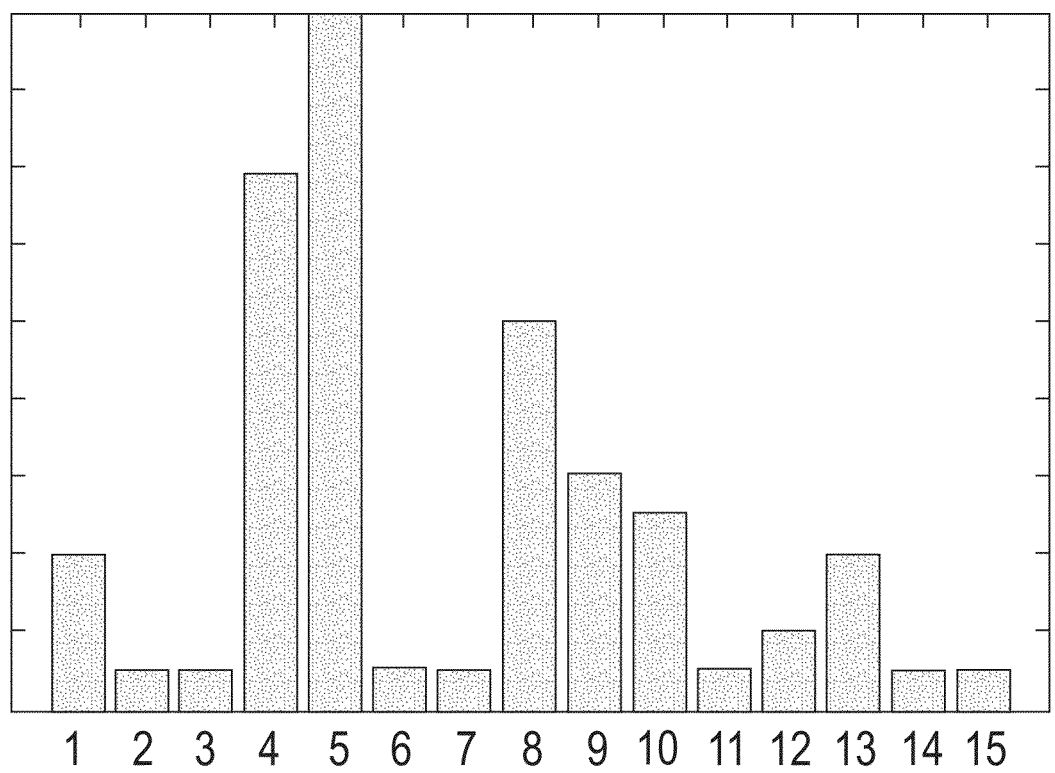
FIG. 15 shows the distribution of the clusters in FIG. 14.

FIG. 14 shows the anomalies found using K-Means on the Gabor features of each tie-plate with out dividing it into grids or using weighted distance metric. As seen, there is no single dominant cluster and the retrieved anomalies are completely erroneous. FIG. 15 shows the distribution of the clusters in FIG. 14. As seen, there is no single dominant cluster standing out. On the other hand, for the resulted dominant clusters, there are many anomalies present in them.

The proposed anomaly detection mechanism can also be applied to on-line detection by incrementally updating the clustering for local units (i.e. cells) and their weights.

Cells may be extracted as was done previously. An alternate weight array which is of the size of the number of cells in each instance may be initialized to zero. For each new cell the distance to existing cell centroids may be computed and the cluster label that is nearest may be assigned, and at the same time this distance may be added to the respective alternate weight. The alternate weights may indicate how different the new cells are compared to the existing cell centroids. After N iterations the alternate weights may be normalized, alternative weights may be multiplied with the old weights, then the result may be re-normalize to get an updated weight array. If more cells become distant to the cell cluster the weight for those cells may be increased and vice-versa, the weights may thus be perturbed incrementally and updated based on the data. The choice of N can determine how quickly or slowly we adapt to new data.

Agglomerative clustering may be performed in the initialization step to get representative centroids for both anomalous and normal instances. Given a new instance, the distance from each new cell to existing cell centroids may be calculated and assigned to the label of the nearest cell cluster. This can result in a vector of labels for the tie plate, the distances can then be calculated from the label vector to the centroids of tie plate clusters that were obtained previously, the minimum distance can be found, then the instance can be assigned to the closest tie plate cluster. The cluster the instance is assigned to may determine if it is normal or an anomaly. As new instances are classified, the tie plate cluster centroids can be recomputed incrementally using existing techniques, keeping the model up-to-date with the data.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiments to the invention has been described, it will be understood that those skilled in the art, both now and in the future, may make various improvements and enhancements which fall within the scope of the claims which follow. Thus, the claims should be construed to maintain the proper protection for the invention first described.

The invention claimed is:

1. A non-transitory computer program product for detecting tie plate anomalies in a tie plate image, the computer program product comprising:
a computer readable storage medium having computer readable program code embodied therewith, the computer readable program code configured to:
localize a tie plate region in an image from a set of tie plate images;
divide the tie plate region into a set of local units;
extract features from each local unit in the set of local units;
perform a clustering over all local units;
assign a class label to each local unit, the class label indicates a semantic content of the local unit;
determine the weight of each local unit across all images in the set of images; and
categorize the tie plate image as anomalous based on the weight assigned to the local units.

2. The computer program product of claim 1, wherein the computer readable program code is further configured to represent each tie plate region from the set of images with concatenated unit labels, wherein the concatenated unit labels are feature vectors representing the tie plate region.

3. The computer program product of claim 1, wherein the computer readable program code is further configured to perform a global clustering over all tie plate regions in the set of images based on a distance calculation between images in the image set, wherein the distance calculation is based, in part, on the weight of each of the local units in each tie plate region.

4. The computer program product of claim 3, wherein the computer readable program code is further configured to determine the tie plate regions that belong to classes of minorities from the global clustering are anomalous.

5. A system for detecting tie plate anomalies in tie plate images, the system comprising:
a processor;
a memory coupled to the processor, the memory having computer readable program code embodied therewith, the computer readable program code configured to:
localize a tie plate region in an image from a set of tie plate images;
divide the tie plate region into a set of local units;
extract features from each local unit in the set of local units;
perform a clustering over all local units;
assign a class label to each local unit, the class label indicates a semantic content of the local unit;
determine the weight of each local unit across all images in the set of images; and
categorize the tie plate image as anomalous based on the weight assigned to the local units.

6. The system of claim 5, wherein the local units form an M by N two-dimensional regular grid having M rows and N columns.

7. The system of claim 5, wherein the computer readable program code are further configured to:
calculate a centroid for each cluster of the local units; and
incrementally update the centroid of each local unit cluster in real time by including the corresponding local units of the new tie plate images.

8. The system of claim 7, wherein the computer readable program code are further configured to incrementally update a weight of each of the local units in real-time by utilizing an original weight and an alternate weight array.

9. The computer program product of claim 1, wherein the local units form an M by N two-dimensional regular grid having M rows and N columns.

10. The computer program product of claim 1, wherein the computer readable program code is further configured to:
calculating a centroid for each cluster of the local units; and
incrementally update the centroid of each local unit cluster in real time by including the corresponding local units of the new tie plate images.

11. The computer program product of claim 10, wherein the computer readable program code is further configured to incrementally update a weight of each of the local units in real-time by utilizing an original weight and an alternate weight array.

* * * * *